Nov. 3, 1942.  H. J. FLAHERTY  2,300,913
INSULATOR BUSHING
Filed July 22, 1941
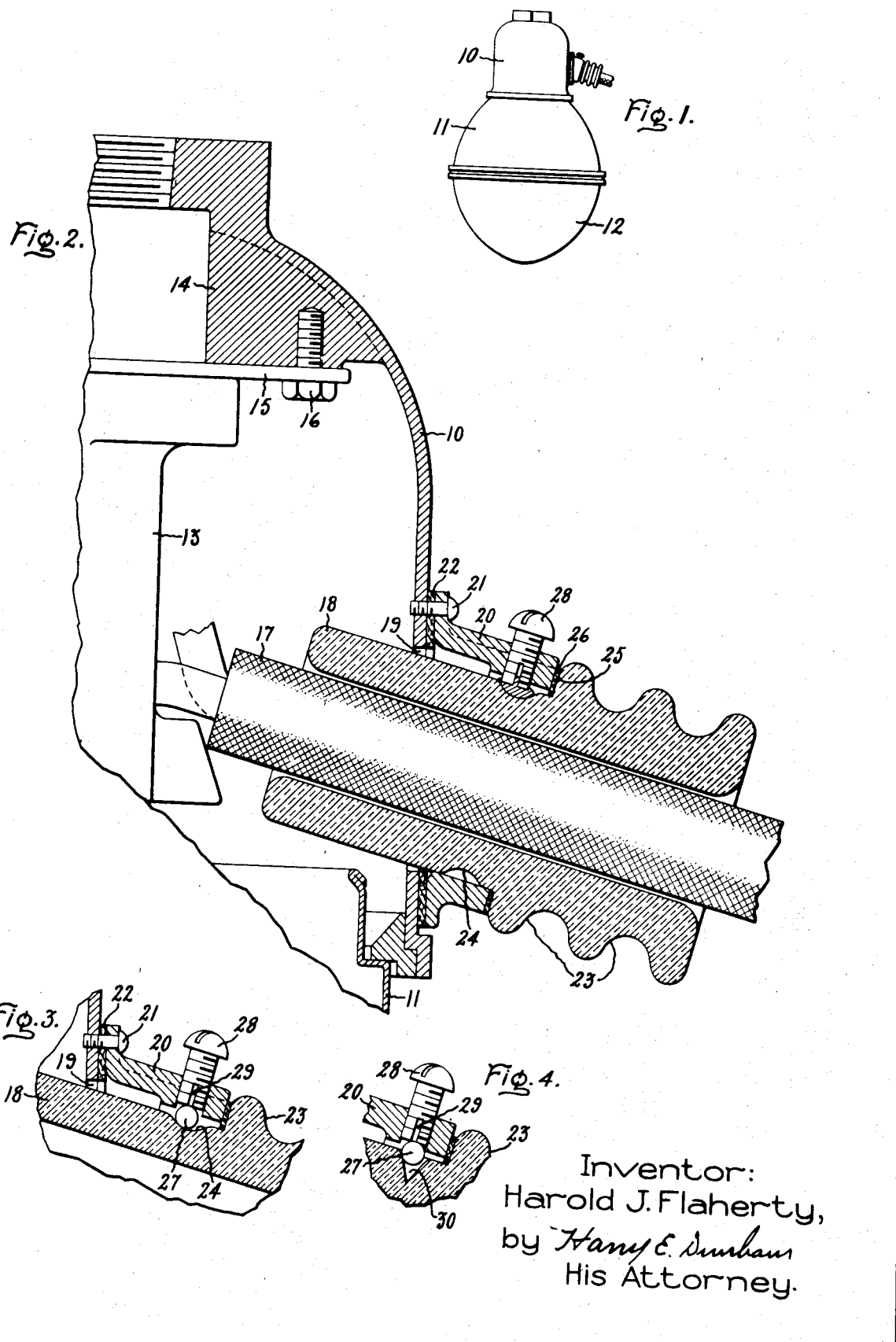
Inventor:
Harold J. Flaherty,
by Harry E. Dunham
His Attorney.

Patented Nov. 3, 1942

2,300,913

UNITED STATES PATENT OFFICE 2,300,913

INSULATOR BUSHING

Harold J. Flaherty, Lynnfield, Mass., assignor to General Electric Company, a corporation of New York Application July 22, 1941, Serial No. 403,477

2 Claims. (Cl. 174—152)

My invention relates to insulator bushings and more particularly to a manner of fastening porcelain bushings in metallic casings.

One object of my invention is to provide an improved method and apparatus for rigidly mounting a frangible bushing within a metallic wall.

For a better understanding of my invention, together with other and further objects thereof, reference is had to the following description taken in connection with the accompanying drawing, and its scope will be pointed out in the appended claims.

In the accompanying drawing Fig. 1 illustrates a street lighting luminaire to which my invention is applied; Fig. 2 is a fragmentary enlarged sectional view of Fig. 1; Fig. 3 is a fragmentary view of Fig. 2; and Fig. 4 is another fragmentary view of Fig. 2 illustrating a modification of my invention.

Referring to the drawing in detail, Fig. 1 is the front elevation of a luminaire comprising a hood 10, a reflector 11 and a glass globe 12. The details of this type of luminaire are fully described in U. S. Patent 2,110,018—Halvorson. The hood 10, as shown more clearly in Fig. 2, is a hollow metal casing within which a suitable porcelain receptacle 13 is secured to the lugs 14 on the inside surface of the hood 10 by a plate 15 and bolts 16. Current is brought to this receptacle by a cable 17 projecting through an insulator bushing 18. This bushing projects through an opening 19 in the wall of the hood 10 and through a concentric metal tubular flange or sleeve 20 attached to the outside surface of the hood 10 in any suitable manner such as, for example, by screws 21 with a gasket 22 interposed to make a water-tight joint. The bushing 18 is provided with rain-shedding fins 23 at the exposed end which is outside of the sleeve 20. A depression which may be of any suitable shape but is preferably a semi-circular groove 24 is provided in that portion of the bushing which is surrounded by the sleeve 20. When the bushing is assembled with the hood, it is moved into the sleeve until the flat shoulder 25 on the first fin 23 and a gasket 26, placed upon the shoulder, engage the end of the sleeve 20.

In accordance with my invention, the bushing 18 is fastened in the sleeve by means of a metallic deformable pellet 27 more clearly shown in Figs. 3 and 4 and by a metal screw 28 threaded through the flange or sleeve 20. The position of the screw relative to the groove 24 in the bushing 17 is such that the center of the groove is slightly spaced from the center of the screw and spaced toward the outer end of the sleeve 20. The screw 28 is preferably slotted at its end, having a slot 29 through its axis. When it is turned downwardly it engages the pellet 27, which may be made of any soft metal such as lead or an alloy thereof, and deforms this pellet. The pellet in the present instance is spherical but it is obvious that any other shape may be used. The pellet is originally of such size that it projects into the threaded hole through which the screw is forced toward the pellet. During the assembly of this device, the bushing is first inserted into the sleeve 20, the pellet is dropped into the threaded hole, and the screw is threaded into the hole thereafter. As the screw proceeds on its way downwardly, the pellet is deformed, the metal thereof being forced into the slot 29 of the screw. The direction of this force is along the axis of the screw and the metal seeks to flow into the deepest portion of the groove. Because of the displacement between the direction of this force and the deepest part of the groove, a component of this force is exerted against the wall of the groove which tends to pull the bushing into the sleeve 20, thereby effecting a water-tight joint between the gasket 26, the end of the sleeve 20 and the shoulder 25. The metal flowing into the slot 29 of the screw expands the screw so as to increase the friction between the screw and the threaded hole and thereby locking the screw into its final position. In this construction the relatively hard metal of the screw 28 does not enter the groove 24. It is only the relatively soft metal of the pellet which engages the groove wall and also flows around the end of the screw as well as into the slot 29. The shearing resistance between the metal in the groove and the metal which is in the slot and around the end of the screw determines the force that holds the bushing in its sleeve 20. This shearing resistance is sufficiently great to hold the bushing tightly in its place. The soft metal in contact with the bushing eliminates breakage which would occur often if the end of the screw were in engagement with the bushing.

In Fig. 4 I have illustrated a fragmentary view of the sleeve 20 and bushing 18 similar to Fig. 3. In this figure the bushing 18 is provided with a conical depression 30 which takes the place of the semi-circular groove 24 shown in Figs. 2 and 3. The advantage of that substitution is that the bushing will be locked against rotation and may be definitely located by this depression. The axis of this conical depression may be offset from the axis of the screw in the same manner as the axis of the groove 24 is offset from the axis of the screw whereby the same drawing-in force is obtained for drawing the bushing up against the end of the sleeve 20.

The above construction is applicable to any metallic housing for electrical apparatus wherein it is desired to clamp rigidly a frangible bushing, such as the porcelain bushing described, to form a water-tight rigid joint.

What I claim as new and desire to secure by Letters Patent of the United States is:

1. The combination of a metallic wall, a tubular flanged opening therein, said flange having a threaded hole therethrough, a bushing provided with a conical depression mounted in said flange, a deformable metallic pellet in said hole and in said depression, and a screw provided with a slotted end in said threaded hole arranged to deform said pellet when turned down through said hole, thereby effecting a flow of the metal of said pellet, part of the metal flowing into said slot and a part of the metal flowing into said depression to form a rigid connection between said flange and said bushing.

2. The combination of a metallic wall, a tubular flanged opening therein, said tubular flange having a threaded hole therein, a bushing provided with a depression mounted in said tubular opening with the said depression substantially opposite the end of said threaded hole, a screw provided with a slotted end in said threaded hole, and a deformed pellet between the end of said screw and said bushing, a part of the metal of said pellet being in said slot and a part of the metal being in said depression thereby forming a rigid joint between said tubular flange and said bushing.

HAROLD J. FLAHERTY.